United States Patent
Cho et al.

(10) Patent No.: US 8,069,478 B2
(45) Date of Patent: *Nov. 29, 2011

(54) UNIT USING OS AND IMAGE FORMING APPARATUS USING THE SAME

(75) Inventors: Won-il Cho, Seongnam-si (KR);
Jae-sung Lee, Hwaseong-si (KR);
Yoon-tae Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,696

(22) Filed: Sep. 24, 2010

(65) Prior Publication Data

US 2011/0004768 A1    Jan. 6, 2011

Related U.S. Application Data

(63) Continuation of application No. 12/367,589, filed on Feb. 9, 2009.

(30) Foreign Application Priority Data

Mar. 3, 2008    (KR) .................. 10-2008-0019844
Jun. 30, 2008    (KR) .................. 10-2008-0063063

(51) Int. Cl.
*G06F 7/04*    (2006.01)
*G06F 12/00*    (2006.01)
*G06F 12/14*    (2006.01)

(52) U.S. Cl. ................... 726/20; 726/26; 726/34

(58) Field of Classification Search ............ 726/20, 726/26, 34
See application file for complete search history.

(56) References Cited

U.S. PATENT DOCUMENTS

| | | | | |
|---|---|---|---|---|
| 5,537,517 | A | * | 7/1996 | Wakabayashi et al. ...... 358/1.16 |
| 5,765,197 | A | * | 6/1998 | Combs .......................... 711/164 |
| 6,332,024 | B1 | * | 12/2001 | Inoue et al. ............... 379/433.06 |
| 6,332,062 | B1 | | 12/2001 | Phillips et al. |
| 6,532,551 | B1 | * | 3/2003 | Kamei et al. .................... 714/13 |
| 7,033,011 | B2 | * | 4/2006 | Murakami et al. .............. 347/86 |
| 7,206,092 | B2 | * | 4/2007 | Honma ......................... 358/1.15 |
| 7,246,098 | B1 | * | 7/2007 | Walmsley ....................... 705/64 |
| 7,286,772 | B2 | * | 10/2007 | Hwang ............................. 399/8 |
| 7,286,774 | B1 | * | 10/2007 | Miller et al. .................... 399/12 |

(Continued)

FOREIGN PATENT DOCUMENTS

JP    2002-014576    1/2002

(Continued)

OTHER PUBLICATIONS

Korean Office Action issued Sep. 28, 2010 in KR Application No. 2008-0063068.

(Continued)

*Primary Examiner* — David García Cervetti
(74) *Attorney, Agent, or Firm* — Stanzione & Kim, LLP

(57) ABSTRACT

A chip mountable on a replaceable unit used in an image forming job is disclosed. The chip includes a central processing unit (CPU) to perform at least one of authentication and cryptographic data communication with a main body of the image forming apparatus using an operating system (OS) of the CPU which operates separately from an OS of the image forming apparatus. With the use of such a configuration, security for a unit in which the chip is mounted can thereby be reinforced.

19 Claims, 6 Drawing Sheets

U.S. PATENT DOCUMENTS

| | | | |
|---|---|---|---|
| 7,343,298 B2 * | 3/2008 | Asauchi et al. | 705/60 |
| 7,383,444 B2 * | 6/2008 | Toyama et al. | 713/192 |
| 2002/0010875 A1 * | 1/2002 | Johnson et al. | 714/5 |
| 2002/0030712 A1 * | 3/2002 | Silverbrook | 347/19 |
| 2003/0016504 A1 * | 1/2003 | Raynham | 361/727 |
| 2003/0123887 A1 | 7/2003 | Imes et al. | |
| 2004/0004651 A1 * | 1/2004 | Silverbrook | 347/86 |
| 2004/0255149 A1 * | 12/2004 | Toyama et al. | 713/200 |
| 2005/0076088 A1 * | 4/2005 | Kee et al. | 709/206 |
| 2005/0146583 A1 * | 7/2005 | Silverbrook | 347/87 |
| 2005/0162455 A1 * | 7/2005 | Silverbrook | 347/19 |
| 2005/0172118 A1 * | 8/2005 | Nasu | 713/156 |
| 2005/0206672 A1 | 9/2005 | Adkins et al. | |
| 2006/0133831 A1 | 6/2006 | Rommelmann et al. | |
| 2006/0136989 A1 | 6/2006 | Rodriguez et al. | |
| 2006/0146355 A1 * | 7/2006 | Kim | 358/1.13 |
| 2006/0168580 A1 * | 7/2006 | Harada et al. | 717/174 |
| 2007/0160204 A1 * | 7/2007 | Kimura et al. | 380/46 |
| 2007/0211285 A1 * | 9/2007 | Shipton | 358/1.15 |
| 2008/0087736 A1 * | 4/2008 | Silverbrook | 235/494 |
| 2008/0252701 A1 * | 10/2008 | Matsumoto et al. | 347/86 |

FOREIGN PATENT DOCUMENTS

JP  2004-086232  3/2004

OTHER PUBLICATIONS

Korean Office Action issued Sep. 28, 2010 in KR Application No. 2008-0063065.

Korean Office Action issued Sep. 28, 2010 in KR Application No. 2008-0063063.

European Search Report issued Mar. 9, 2011 in EP Application No. 09718117.6.

* cited by examiner

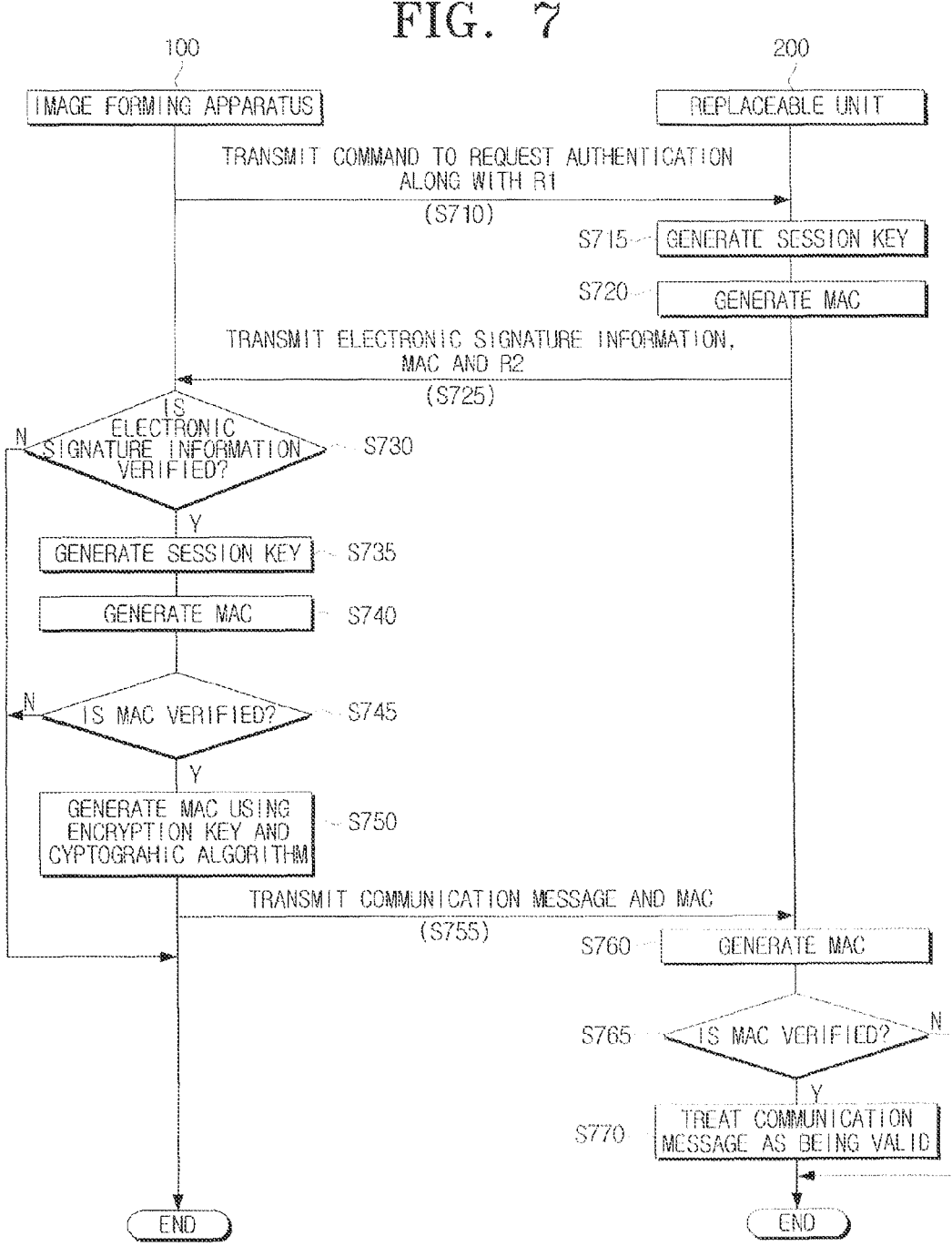

UNIT USING OS AND IMAGE FORMING APPARATUS USING THE SAME

CROSS-REFERENCE TO RELATED APPLICATIONS

This application is a Continuation Application of U.S. patent application Ser. No. 12/367,589, filed Feb. 9, 2009 in the U.S. Patent and Trademark Office, which claims priority under 35 U.S.C. §119 (a) from Korean Patent Application Nos. 10-2008-0019844 and 10-2008-0063063, filed on Mar. 3, 2008 and Jun. 30, 2008, respectively, in the Korean Intellectual Property Office, the disclosures of which are incorporated herein by reference in their entirety.

BACKGROUND OF THE INVENTION

1. Field of the Invention

The present general inventive concept relates to a unit including a built-in central processing unit (CPU) and an image forming apparatus using the same. More particularly, the present general inventive concept relates to a unit which becomes more secure by having a CPU with an operating system (OS), and an image forming apparatus using the same.

2. Description of the Related Art

As computers have become widely used, peripherals have also become widespread. Examples of peripherals are an image forming apparatuses such as printers, scanners, copiers, and multifunction devices.

Image forming apparatuses use ink or toner to print images onto paper. Ink and toner are used whenever image forming operations are performed, until the ink toner is finally exhausted. If ink or toner is empty, a user must replace a unit for storing the ink or toner. Such components which are replaceable while using the image forming apparatuses are referred to as consumables or replaceable units.

Among replaceable units, some units other than units which have to be replaced when the ink or toner is exhausted must be replaced after being used for a predetermined period of time. This is so even if ink or toner are not exhausted since properties of the units change after the predetermined period of time and the printing quality is thus reduced.

For example, a laser image forming apparatus includes a charge unit, a transfer unit, a fusing unit, and so on, and diverse kinds of rollers and belts used in each unit may be worn out or damaged due to use over a limited life span. As a result, the printing quality may be remarkably deteriorated. Therefore, the user has to replace such replaceable units at appropriate times.

The time to replace replaceable units can be determined using a use state index. The use state index represents an index to indicate the degrees of use of the image forming apparatus, for example, the number of pieces of paper printed by the image forming apparatus and the number of dots forming an image. The image forming apparatus can determine the time to replace replaceable units by measuring the number of pieces of paper printed by the image forming apparatus or the number of dots.

Recently, in order for the user to precisely determine the time to replace each replaceable unit, each replaceable unit has included a built-in customer replaceable unit monitoring memory (CRUM memory). The use state index of each replaceable unit is stored in the CRUM memory. Accordingly, even if each replaceable unit is separated and used in different image forming apparatuses, the use state of each replaceable unit can be determined precisely.

However, a conventional replaceable unit having a CRUM memory has a problem that users can easily access the CRUM memory. Information stored in the CRUM memory is very diverse, spanning from basic information regarding the manufacturer to information regarding the recent use state. If the information is modified, it is difficult to receive after-sale service and calculate the adequate time to replace the replaceable unit, resulting in degradation of image forming operations. In particular, if information regarding the manufacturer is modified, it is impossible to determine whether it is authentic and thus is difficult to manage the replaceable unit.

SUMMARY

The present general inventive concept provides a unit which becomes more secure by having a built-in CPU with an operating system (OS), and an image forming apparatus using the same.

Additional features and utilities of the present general inventive concept will be set forth in part in the description which follows and, in part, will become obvious from the description, or may be learned by practice of the general inventive concept.

An embodiment of the present general inventive concept may be achieved by providing a chip which is mountable on a replaceable unit used in an image forming apparatus, the chip including a central processing unit (CPU) to perform at least one of authentication and cryptographic data communication with a main body of an image forming apparatus, using an operating system (OS) of the CPU which operates separately from an OS of the image forming apparatus.

The CPU may perform initialization using the OS of the CPU, separately from the main body of the image forming apparatus.

The CPU may perform the authentication, and perform the cryptographic data communication when the authentication is completed.

Here, the authentication may be performed during the initialization performed separately from the main body of the image forming apparatus.

The CPU may perform the cryptographic data communication such that when communication messages including data and a first message authentication code (MAC) information are transmitted from the main body of the image forming apparatus, a second MAC is generated by the CPU by applying a key and an encryption algorithm to a data portion of the transmitted communication messages, and when the generated second MAC is compared and made consistent with the first MAC information of the transmitted communication messages, the generated second MAC is treated as a valid communication message and processed.

The CPU may perform authentication such that when an authentication request is received from the main body of the image forming apparatus, a MAC is generated and the generated MAC and unique digital signature information are transmitted to the main body of the image forming apparatus.

When the image forming apparatus is powered on or when a replacement unit with the chip is mounted on the image forming apparatus, the CPU may perform the initialization according to the OS of the CPU.

The CPU does not respond to a command from the main body of the image forming apparatus before the initialization is completed, and the CPU may perform the at least one of the authentication and the cryptographic data communication when the initialization is completed.

The chip according to the exemplary embodiment of the present general inventive concept may further include a memory unit to store information regarding at least one of the chip, a Customer replaceable unit monitor (CRUM) unit with a built-in chip, and a replaceable unit with the built-in CRUM unit, and the OS of the CPU.

The OS of the CPU may drive at least one of the chip, the CRUM unit, and the replaceable unit, and the OS of the CPU may be software that executes at least one of an initialization operation to independently initialize one state of the chip, the CRUM unit, and the replaceable unit, a processing operation to execute a public cryptographic algorithm, and a mutual authentication operation with the main body of the image forming apparatus.

The memory unit may include at least one of an OS memory to store the OS of the CPU, a non-volatile memory to store data in non-volatile form, and a volatile memory to be used as a temporary storage space required for operations.

The chip may further include a tamper detector to respond to physical hacking attempts.

The chip may further include a crypto unit to allow the CPU to perform the authentication or the cryptographic data communication with the image forming apparatus by applying the preset cryptographic algorithm among a plurality of cryptographic algorithms.

The cryptographic algorithm applied to any one of the authentication and the cryptographic data communication may be changeable.

The OS of the CPU may have a software structure including a memory recovery region, and the CPU may back up previous recorded values within the memory recovery region and set a start flag when a data writing operation for the memory unit is executed.

The CPU may check the values of the start flag when a specific event happens, and then determine whether the values rolled back to the previous recorded values have to be recorded as a current degree of use.

The CPU may receive values of degrees of use of consumables used for the image forming job from the main body of the image forming apparatus when the image forming job is executed, add the values to the information on the degrees of use of consumables stored in the memory unit, and then refreshes the information on the degrees of use of consumables stored in the memory unit.

An embodiment of the present general inventive concept may be achieved by providing a CRUM unit which is mountable on an image forming apparatus to be used in an image forming job, the CRUM unit including a memory unit to store information regarding the CRUM unit or a replaceable unit on which the CRUM unit is mounted; and a CPU to manage the memory unit using the operating system (OS) of the CPU which operates separately from an OS of the image forming apparatus, and to perform at least one of authentication and cryptographic data communication with the main body of an image forming apparatus.

The CPU may perform initialization using the OS of the CPU, operating separately from the main body of the image forming apparatus.

The OS of the CPU may drive the CRUM unit or a replaceable unit, and the OS of the CPU may include software that executes at least one of an initialization operation to independently initialize the state of the CRUM unit or the replaceable unit, a processing operation to execute a public cryptographic algorithm, and a mutual authentication operation between the main body of the image forming apparatus.

The CPU may perform the authentication between the main body of the image forming apparatus and the replaceable unit, and perform cryptographic data communication when the authentication is completed.

The CPU may perform the cryptographic data communication in such a manner that when communication messages including data and message authentication code (MAC) information are transmitted from the main body of the image forming apparatus, a MAC is generated by applying a key and an encryption algorithm to a data portion of the transmitted communication messages, and when the generated MAC is compared and made consistent with the MAC information of the transmitted communication messages, the generated MAC is treated as a valid communication message and processed.

When an authentication request is received from the main body of the image forming apparatus, the CPU may generate a MAC and transmits the generated MAC and unique digital signature information to the main body of the image forming apparatus.

When the image forming apparatus is powered on or a replaceable unit with the built-in CRUM unit is mounted on the image forming apparatus, the CPU may perform the initialization, and not respond to a command from the main body of the image forming apparatus before the initialization is completed.

The memory unit may include at least one of an OS memory to store its own OS, a non-volatile memory to store data in non-volatile form, and a volatile memory to be used as a temporary storage space required for operations.

The CRUM unit may further include an interface unit to connect the image forming apparatus to the CPU, a temper detector to respond to physical hacking attempts, and a crypto unit to allow the CPU to perform the authentication or the cryptographic data communication with the image forming apparatus by applying the preset cryptographic algorithm among a plurality of cryptographic algorithms.

The cryptographic algorithm applied to any one of the authentication and the cryptographic data communication may be changeable.

The OS of the CPU may have a software structure including a memory recovery region, and the CPU may back up previous recorded values within the memory recovery region and sets a start flag when a data writing operation for the memory unit is executed.

The CPU may check the values of the start flag when a specific event happens, and then determine whether the values rolled back to the previous recorded values have to be recorded as a current degree of use.

The CPU may receive values of degrees of use of consumables used for the image forming job when the image forming job is executed, from the main body of the image forming apparatus, add the values to the information on the degrees of use of consumables stored in the memory unit, and then refresh the information on the degrees of use of consumables stored in the memory unit.

An embodiment of the present general inventive concept may be achieved by providing a replaceable unit which is mountable on an image forming apparatus, the replaceable unit comprising a memory unit to store information on the replaceable unit, and a CPU to manage the memory unit using an operating system (OS) of the CPU which operates separately from an OS of the image forming apparatus, and to perform at least one of authentication and cryptographic data communication with the main body of an image forming apparatus.

The CPU may perform initialization using the OS of the CPU, operating separately from the main body of the image forming apparatus.

The OS of the CPU may drive the CRUM unit or the replaceable unit and the OS of the CPU may include software that executes at least one of an initialization operation to independently initialize the state of the CRUM unit or the replaceable unit, a processing operation to execute a public cryptographic algorithm, and a mutual authentication operation between the main body of the image forming apparatus and the replaceable unit.

The CPU may perform authentication between the main body of the image forming apparatus and the replaceable unit, and perform the cryptographic data communication when the authentication is completed.

The CPU may perform the cryptographic data communication such that when communication messages including data and a first message authentication code (MAC) information are transmitted from the main body of the image forming apparatus, a second MAC is generated by the CPU by applying a key and an encryption algorithm to a data portion of the transmitted communication messages, and when the generated second MAC is compared and made consistent with the first MAC information of the transmitted communication messages, the generated second MAC is treated as a valid communication message and processed.

When an authentication request is received from the main body of the image forming apparatus, the CPU may generate a MAC and transmit the generated MAC and unique digital signature information to the main body of the image forming apparatus.

When the image forming apparatus is powered on or the replaceable unit is mounted on the image forming apparatus, the CPU may perform the initialization, and not respond to a command from the main body of the image forming apparatus before the initialization is completed.

The memory unit may include at least one of an OS memory to store its own OS, a non-volatile memory to store data in non-volatile form, and a volatile memory to be used as a temporary storage space required for operations.

The replaceable unit may further include an interface unit to connect the image forming apparatus to the CPU, a temper detector to respond to physical hacking attempts, and a crypto unit to allow the CPU to perform the authentication or the cryptographic data communication with the image forming apparatus by applying the set cryptographic algorithm among a plurality of cryptographic algorithms.

The cryptographic algorithm applied to any one of the authentication and the cryptographic data communication may be changeable.

The OS of the CPU may have a software structure including a memory recovery region, and the CPU may backup previous recorded values within the memory recovery region and sets a start flag when a data writing operation for the memory unit is executed, and the CPU may further check the values of the start flag when a specific event happens and then determines whether the values rolled back to the previous recorded values have to be recorded as current degrees of use.

The CPU may receive values of degrees of use of consumables used for the image forming job when the image forming job is executed using the replaceable unit, from the main body of the image forming apparatus, add the values to the information on the degrees of use of consumables stored in the memory unit, and then refresh the information on the degrees of use of consumables stored in the memory unit.

An embodiment of the present general inventive concept may be achieved by providing an image forming apparatus comprising a main controller, and at least one unit which includes a memory unit to store information and a CPU to manage the memory unit using an operating system (OS) of the CPU, operating separately from an OS of the main controller, and to perform at least one of authentication and cryptographic data communication with the main controller.

The CPU may perform initialization using the OS of the CPU, operating separately from the main controller.

The at least one unit may perform at least one of the authentication and the cryptographic data communication with the main controller using a preset cryptographic algorithm. Here, the cryptographic algorithm may be changeable.

When the authentication for the unit is succeeded, the main controller may generate a MAC by applying preset key and encryption algorithm to data, generate communication messages including the generated MAC and the data, and transmit the generated communication messages to the CPU of the unit.

The main controller may request authentication to the CPU of the at least one unit, and when digital signature information and the MAC are transmitted from the CPU, the main controller may detects the digital signature information and the MAC to perform the authentication.

The main controller may perform the authentication and the cryptographic data communication between the at least one unit and the main controller using the unique cryptographic algorithm set for each unit of the at least one unit.

The main controller may perform the authentication and the cryptographic data communication by applying a RSA asymmetric key algorithm and one of ARIA, TDES, SEED, and AES symmetric key algorithms, and the CPU of the unit may perform the authentication and the cryptographic data communication by applying one of the ARIA, TDES, SEED, AES symmetric key algorithms.

The unit further includes a crypto unit to allow the CPU to perform the authentication or the cryptographic data communication with the main controller of the image forming apparatus by applying the set cryptographic algorithm among a plurality of cryptographic algorithms; and a temper detector to respond to physical hacking attempts.

The OS of the CPU provided in the CPU of the unit may have a software structure including a memory recovery region, and the CPU may back up previous recorded values within the memory recovery region and set a start flag when a data writing operation for the memory unit is executed.

The CPU may check the values of the start flag when a specific event happens, and then determine whether the values rolled back to the previous writing values have to be recorded as current degrees of use.

The main controller may be connected to the at least one unit through one serial I/O channel, and be accessed to the at least one unit using individual addresses given to each unit.

When the job is executed, the main controller may measure values of degrees of use of consumables used for the job, transmit the measured values to each CPU of the at least one unit, add the values to the information on the degrees of use of consumables pre-stored in each CPU, and then refresh the information on the degrees of use of consumables stored in the unit.

The image forming apparatus may further include a storage unit to store the information on the use of consumables. In this case, the main controller adds the measured values of degrees of use of the consumables used to information on the degrees of use of consumables pre-stored in the storage unit, and then manages the information on the use of consumables stored individually with the at least one storage unit.

The main controller may compare the information on the degrees of use of consumables stored in the storage unit with the information on the degrees of use of consumables stored in the unit, and check the accuracy of the information.

The main controller may generate a MAC by applying a key and an encryption algorithm to data to be transmitted to the unit and transmit the generated MAC and the data to the CPU of the unit, to allow the MAC used in each transmission to vary.

The OS of the CPU may include software that executes at least one of an initialization operation, a processing operation to execute a public cryptographic algorithm, and a mutual authentication operation between the main controller and the replaceable unit.

The unit may be one of a replaceable unit directly associated in an image forming job of the image forming apparatus, a CRUM unit mountable on the replaceable unit, and a chip mountable on the CRUM unit.

An embodiment of the present general inventive concept may also be achieved by providing a computer readable medium to contain computer-readable codes as a program to perform a method, the method including performing at least one of authentication and cryptographic data communication with a main body of an image forming apparatus using an operating system (OS) of a central processing unit (CPU), which operates separately from an OS of the image forming apparatus.

An embodiment of the present general inventive concept may also be achieved by providing a semiconductor chip package which is mountable on a replaceable unit in an image forming apparatus having an operating system (OS), the semiconductor chip including a memory to store data, and a central processing unit (CPU) to process the data such that the processed data is transmitted to the operating system (OS) of the image forming apparatus.

The memory and the processor are disposed in a single integrated body.

An embodiment of the present general inventive concept may also be achieved by providing a computer readable medium containing computer-readable codes as a program to perform at least one of authentication and cryptographic data communication with a main body of an image forming apparatus using an operating system (OS) of a central processing unit (CPU), which operates separately from an OS of the image forming apparatus.

An embodiment of the present general inventive concept may also be achieved by providing a replaceable unit which is mountable on an image forming apparatus to be used in an image forming job, the replaceable unit including a memory unit to store information on the replaceable unit, and a CPU to manage the memory unit using an operating system (OS) of the CPU which operates separately from an OS of the image forming apparatus, and to perform at least one of authentication and cryptographic data communication with the main body of an image forming apparatus, wherein random values are used upon transmitting information or commands for authentication between the CPU and the main body of the image forming apparatus.

An embodiment of the present general inventive concept may also be achieved by providing an image forming apparatus, including a main controller, and at least one unit which includes a memory unit to store information and a CPU to manage the memory unit using an operating system (OS) of the CPU that operates separately from an OS of the main controller, and to perform at least one of authentication and cryptographic data communication with the main controller, wherein random values are used upon transmitting information or commands for authentication, between the CPU and the OS of the main controller of the image forming apparatus.

An embodiment of the present general inventive concept may also be achieved by providing a chip which is mountable on a replaceable unit used in an image forming apparatus, the chip including a central processing unit (CPU) with an operating system (OS) of the CPU, which operates separately from an OS of the image forming apparatus, to perform at least one of authentication and cryptographic data communication with a main body of an image forming apparatus, using the OS of the CPU, and a memory unit to store information regarding at least one of the chip, a customer replaceable unit monitoring (CRUM) unit, a replaceable unit with the CRUM unit, and the OS of the CPU, wherein the OS of the CPU is provided in the memory unit within the chip or in memory external to the chip.

An embodiment of the present general inventive concept may also be achieved by providing a customer replaceable unit monitoring (CRUM) unit which can be used in an image forming apparatus, the CRUM unit including a memory unit to store information regarding a unit on which the CRUM unit is mounted, and a CPU to manage the memory unit using an operating system (OS) of the CPU, which operates separately from an OS of the image forming apparatus, and to perform at least one of authentication and cryptographic data communication with the main body of an image forming apparatus, wherein the OS of the CPU comprises a memory recovery region configured to determine whether an update is successfully achieved according to a process of updating the condition information of the CRUM unit.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 7 is a flowchart illustrating a method of performing authentication and cryptographic data communications between the image forming apparatus and the replaceable unit according to an exemplary embodiment of the present general inventive concept.

DETAILED DESCRIPTION OF THE PREFERRED EMBODIMENTS

Figure 1:
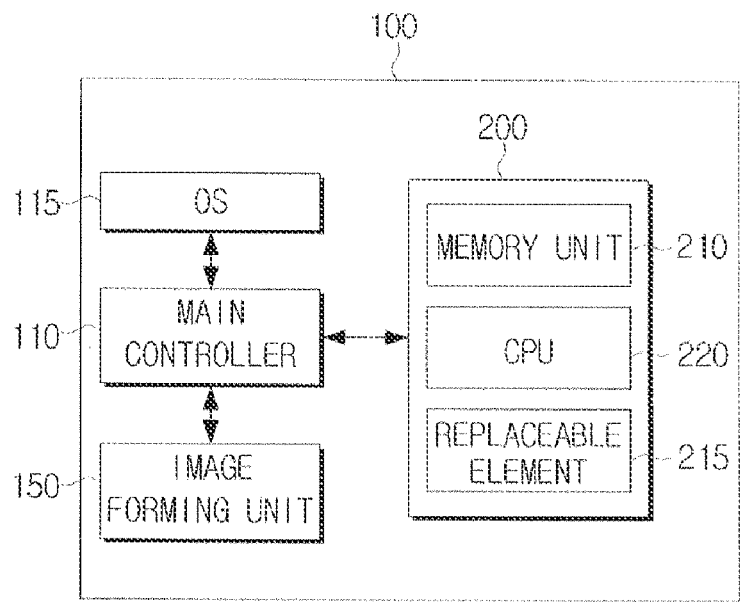
FIG. 1 is a schematic block diagram illustrating a configuration of an image forming apparatus including a replaceable unit according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram illustrating a configuration of an image forming apparatus including a replaceable unit according to an exemplary embodiment of the present general inventive concept. As illustrated in FIG. 1, the image forming apparatus 100 includes a main controller 110, and a unit 200 may be built into the image forming apparatus 100. The image forming apparatus 100 may be a copier, a printer, a multifunction peripheral, a facsimile machine, or a scanner.

The image forming apparatus 100 may include an operating system (OS) 115 to control operations of the image forming apparatus 100. The unit 200 represents a component which is designed to be installed and used independently. More specifically, the unit 200 may be a replaceable unit including at least one replaceable element 215 which is formed in the image forming apparatus and directly intervenes in the image forming operation. For example, the at least one replaceable element 215 of the replaceable unit 200 may be a toner or ink cartridge, a charge unit, a transfer unit, a fusing unit, an organic photo conductor (OPC), a feeding unit, or a feeding roller, etc.

Furthermore, the unit 200 may be any other component which is necessary for the image forming apparatus 100, and is replaceable during use. That is, the unit 200 may be a customer replaceable unit monitor (CRUM) which can monitor and manage the state of a component by being included in the replaceable unit, or may be a chip built into the CRUM. The unit 200 can be implemented in diverse forms, but a unit 200 implemented as a replaceable unit is described hereinbelow for convenience of description.

The main controller 110 may have an interface to communicate with an external device (not illustrated) to receive data and may perform an image forming operation using the received data. The main controller 110 may also be connected to a facsimile unit or a scanning unit, for example, to receive or transmit data corresponding to the image forming operation.

The image forming apparatus 100 may include an image forming unit 150 to perform the image forming operation using the unit 200. The unit 200 can be part of the image forming unit 150 when being installed in a body of the image forming apparatus 100. The main controller 110 can control the memory unit 210 and the image forming unit 150 to feed a medium into the image forming apparatus to form an image on the medium, and to discharge the medium.

As illustrated in FIG. 1, the unit 200 includes a memory unit 210 and a central processing unit (CPU) 220.

The memory unit 210 stores diverse types of information regarding the unit 200, and, more specifically, stores unique information such as information regarding the manufacturer of the unit 200, information regarding the time of manufacture, a serial number or a model number, diverse programs, information regarding an electronic signature, state information regarding the state of use (for example, how many pieces of paper have been printed up until the present time, what the remaining printable capacity is, or how much toner is left).

For example, the memory unit 210 may store information as in the following Table 1.

| General Information | |
|---|---|
| OS Version | CLP300_V1.30.12.35 02-22-2007 |
| SPL-C Version | 5.24 06-28-2006 |
| Engine Version | 6.01.00(55) |
| USB Serial Number | BH45BAIP914466B. |
| Set Model | DOM |
| Service Start Date | 2007-09-29 |
| Option | |
| RAM Size | 32 Mbytes |
| EEPROM Size | 4096 bytes |
| USB Connected (High) | |
| Consumables Life | |
| Total Page Count | 774/93 Pages(Color/mono) |
| Fuser Life | 1636 Pages |
| Transfer Roller Life | 864 Pages |
| Tray1 Roller Life | 867 Pages |
| Total Image Count | 3251 Images |
| Imaging Unit/Deve Roller Life | 61 Images/19 Pages |
| Transfer Belt Life | 3251 Images |
| Toner Image Count | 14/9/14/19 Images(C/M/Y/K) |
| Toner Information | |
| Toner Remains Percent | 99%/91%/92%/100% (C/M/Y/K) |
| Toner Average Coverage | 5%/53%/31%/3% (C/M/Y/K) |
| Consumables Information | |
| Cyan Toner | SAMSUNG(DOM) |
| Magenta Toner | SAMSUNG(DOM) |
| Yellow Toner | SAMSUNG(DOM) |
| Black Toner | SAMSUNG(DOM) |
| Imaging unit | SAMSUNG(DOM) |
| Color Menu | |
| Custom Color | Manual Adjust(CMYK: 0,0,0,0) |
| Setup Menu | |
| Power Save | 20 Minutes |
| Auto Continue | On |
| Altitude Adj. | Plain |

As illustrated in Table 1 above, the memory unit 210 may store diverse information regarding life span of consumables, and setup menus, as well as schematic information regarding the unit 200. The memory unit 210 may also store information of an operating system (OS) to process data stored therein such that the main controller 110 can control the image forming unit 150 and the unit 200 to perform the image forming operation.

The CPU 220 manages the memory unit 210 using an operating system (OS) of the CPU 220. The OS, which is provided to operate the unit 200, represents software to operate general application programs. Accordingly, the CPU 220 can perform self-initialization using the OS.

In greater detail, the CPU 220 performs initialization at the time of particular events, for example, when the image forming apparatus 100 including the unit 200 is turned on, or when the unit 200 or a component including the unit 200, such as a replaceable unit is attached to or detached from the image forming apparatus 100. Initialization includes initial driving of diverse application programs used in the unit 200, calculation of secret information needed for data communications with the image forming apparatus after initialization, setup of a communication channel, initialization of a memory value, confirmation of a replacement time, setting of register values in the unit 200, and setting of internal and external clock signals.

Setting of register values represents setting function register values in the unit 200 in order for the unit 200 to operate in the same state as the user previously set. In addition, setting of internal and external clock signals represents adjusting a frequency of an external clock signal provided from the main controller 110 of the image forming apparatus 100 to a frequency of an internal clock signal to be used in the CPU 220 of the unit 200.

Confirmation of the replacement time represents checking the remaining amount of toner or ink in use, anticipating time when the toner or ink will be exhausted, and notifying the main controller 110 of the time. If it is determined during initialization that the toner has already been exhausted, after completing initialization the unit 200 may be implemented to automatically notify the main controller 110 that operation cannot be performed. In other cases, since the unit 200 includes an OS of the CPU 220, diverse forms of initialization can be performed according to the type or characteristic of the unit 200.

Such initialization is performed by the unit 200 itself, and thus is performed separately from initialization performed by the main controller 110 of the image forming apparatus 100.

As described above, the CPU 220 is built in the unit 200 and the unit 200 has its own OS, so if the image forming apparatus 100 is turned on, the main controller 110 can check the remaining amount of consumables and the number of refills, which are stored in the memory unit 210, before requesting communication with the unit 200. Consequently, it takes a shorter time to inform the main controller 110 that consumables should be replaced. For example, if toner is insufficient, the user can turn on the image forming apparatus 100, and convert the image forming apparatus 100 directly into a toner saving mode. The user can also perform the same operation even when only one particular toner is insufficient.

The CPU 220 does not respond to commands of the main controller 110 until initialization is completed. The main controller 110 periodically transmits commands to the CPU 220 until the main controller 110 receives a response from the CPU 220.

If the main controller 110 receives a response, that is, an acknowledgement, authentication is initiated between the main controller 110 and the CPU 220.

In this case, the OS in the unit 200 enables authentication by interaction between the unit 200 and the image forming apparatus 100. However, in order for a conventional image forming apparatus to perform authentication, the main controller of the image forming apparatus unilaterally accesses the unit, identifies unique information for authentication, and compares the unique information with stored information.

However, in the present general inventive concept, the main controller 110 in the image forming apparatus 100 performs its own initialization separately from initialization of the unit 200. Initialization of the unit 200 is completed first due to differences in the size of the systems. If initialization of the unit 200 is completed, the unit 200 can drive a cryptographic algorithm using the OS. More specifically, the unit 200 may drive a cryptographic algorithm in response to a command of the main controller 110 so that interactive authentication between the main controller 110 and the unit 200, not unilateral authentication of the main controller 110, can be performed. Consequently, security of authentication increases.

Such authentication is not limited to the example describe above and may be performed in diverse forms. For example, the main controller 110 may receive a response from the CPU 220 and transmit a command to the CPU 220 requesting authentication. In this case, as illustrated in FIGS. 1 and 7, a random value R1 can be transmitted to the CPU 220 of the replaceable unit 200 along with the command. The CPU 220 receives the request for authentication and the random value R1, generates a session key using the random value R1, generates a first message authentication code (MAC) using the generated session key, and transmits the generated first MAC, pre-stored electronic signature information, and a random value R2 to the main controller 110.

If the main controller 110 identifies the authenticity by verifying the first MAC, the received electronic signature information, the main controller 110 generates a session key using the received random value R2 and the pre-generated random value R1 and generates a second MAC using the session key. Finally, the main controller 110 verifies the second MAC by identifying whether or not the generated second MAC is the same as the received first MAC. As a result, the main controller 110 can determine if authentication has been successfully performed. As described above, since random values are used upon transmitting information or commands for authentication, malicious hacking by a third party can be prevented.

If authentication is successfully performed, cryptographic data communications is performed between the main controller 110 and the CPU of the unit 200. As described above, since the unit 200 has its own OS, a cryptographic algorithm can be executed. Therefore, data validity can be determined by applying the cryptographic algorithm to the data received from the image forming apparatus 100. As a result of this determination, if the data is valid, the unit 200 receives the data and performs an operation to process the data. If the data are not valid, the unit 200 may discard the data as soon as receiving the data. In this case, the unit 200 may notify the main controller 110 that there exists a problem in data communications.

The cryptographic algorithm may use a public standard cryptographic algorithm. Such a cryptographic algorithm can be modified when an encryption key is opened or when security needs to be reinforced.

In the above exemplary embodiment of the present general inventive concept, since the unit 200 has its own OS, and its own initialization, authentication and cryptographic data communications between the unit 200 and the image forming apparatus 100 can be performed efficiently.

Figure 2:
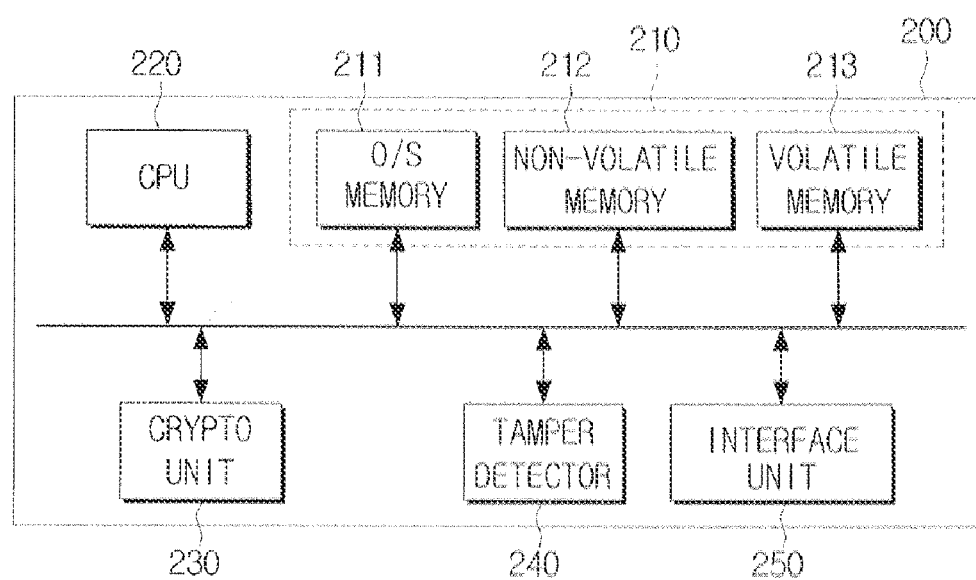
FIG. 2 is a detailed block diagram illustrating a configuration of the replaceable unit according to an exemplary embodiment of the present general inventive concept.

FIG. 2 is a detailed block diagram illustrating the replaceable unit 200 of the image forming apparatus 100 illustrated in FIG. 1. The replaceable unit 200 of FIG. 2 includes a crypto unit 230, a tamper detector 240 and an interface unit 250 in addition to the previously discussed memory unit 210 and CPU 220. Additionally, the replaceable unit 200 may further include a clock unit (not illustrated) to output a clock signal or a random value generator (not illustrated) to generate random values for authentication. The replaceable unit 200 discussed herein may include less components or more components, depending on the application. Further, if the replaceable unit 200 is implemented as a semiconductor chip or semiconductor chip package, the chip or chip package may include either the CPU 220 by itself, or may include both the memory unit 210 and CPU 220. If the chip includes only the CPU 220, an OS executed by the CPU 220 may be provided by an external memory.

The crypto unit 230 supports a cryptographic algorithm and causes the CPU 220 to perform authentication or cryptographic data communication with the main controller 110. Specifically, the crypto unit 230 may support one of four cryptographic algorithms, including ARIA, triple data encryption standard (TDES), SEED, and advanced encryption standard (AES) symmetric key algorithms.

To perform authentication or cryptographic data communication, the main controller 110 also supports the four cryptographic algorithms. Accordingly, the main controller 110 may determine which cryptographic algorithm is applied by the replaceable unit 200, may perform the authentication using the determined cryptographic algorithm, and may then perform the cryptographic data communication with the CPU 220. As a result, the replaceable unit 200 may be easily mounted in the image forming apparatus 100 so that the cryptographic data communication may be performed, even when a key to which a certain cryptographic algorithm is applied is generated.

The tamper detector 240 prevents various physical hacking attacks, namely tampering. In more detail, if an attack is detected by monitoring operating conditions such as the voltage, temperature, pressure, light or frequency, the tamper detector 240 may delete data relating to the attack, or may physically prevent the attack. In this situation, the tamper detector 240 may include an extra power source to supply power to maintain the operation thereof. The attack may be a decap attack which can be a potentially damaging attack to the CRUM unit 200, for example.

As described above, the replaceable unit 200 includes the crypto unit 230 and tamper detector 240, so it is possible to systematically secure data using either or both hardware and software.

Referring to FIG. 2, the memory unit 210 may include at least one of an OS memory 211, a non-volatile memory 212 and a volatile memory 213.

The OS memory 211 stores an OS to operate the replaceable unit 200. The non-volatile memory 212 stores data in non-volatile form, and the volatile memory 213 is used as a temporary storage space required for operations. While the memory unit 210 includes the OS memory 211, non-volatile memory 212 and volatile memory 213 as illustrated in FIG. 2, some of these memories may be built into the CPU 220 as internal memories. The OS memory 211, non-volatile memory 212 and volatile memory 213 may be implemented according to a design for security such as address/data line scrambling or bit encryption, differently from general memories.

The non-volatile memory 212 may store a variety of information, such as digital signature information, information regarding various cryptographic algorithms, information regarding the state of use of the replaceable unit 200 (for example, information regarding the remaining toner level, the time at which toner needs to be replaced, or the number of remaining sheets to be printed), unique information (for example, information regarding the manufacturer of the replaceable unit 200, information regarding the date and time of manufacture, serial number or model number), or repair service information.

The interface unit 250 connects the CPU 220 and the main controller 110. The interface unit 250 may be implemented as a serial interface or wireless interface. For example, a serial interface has an advantage of cost reduction due to the use of fewer signals than a parallel interface, and the serial interface is suitable for an operating condition where a large amount of noise occurs, such as a printer.

The components illustrated in the FIG. 2 are connected to each other via a bus, but this is merely an example. Accordingly, it is to be understood that the components according to aspects of the present general inventive concept may be connected directly without the bus.

Figure 3:
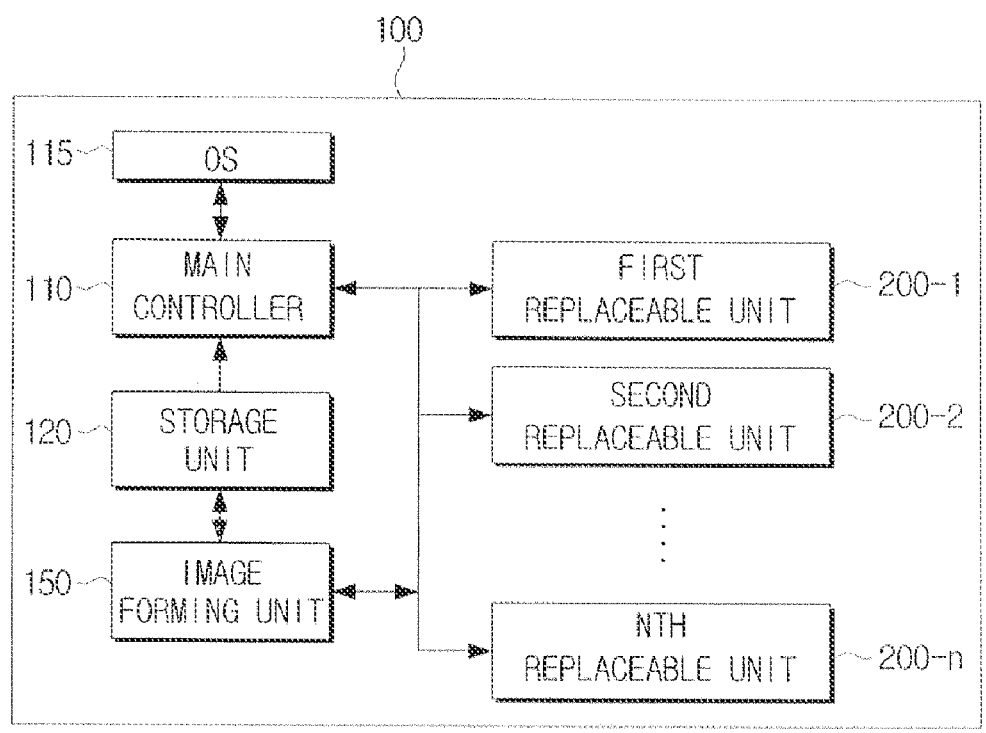
FIG. 3 is a schematic block diagram illustrating a configuration of an image forming apparatus according to an exemplary embodiment of the present general inventive concept.

FIG. 3 is a block diagram illustrating the image forming apparatus 100 according to an exemplary embodiment of the present general inventive concept. The image forming apparatus 100 of FIG. 3 may include an OS 115, a main controller 110, a storage unit 120, an image forming unit 150, and a plurality of units 200-1, 200-2, . . . , 200-n. The plurality of units 200-1, 200-2, . . . , 200-n of FIG. 3 may be CRUM units, semiconductor chips, semiconductor chip packages, or replaceable units. For illustration purposes only, the plurality of units 200-1, 200-2, . . . , 200-n are hereinafter describes as replaceable units.

If a single system requires various consumables, a plurality of units are also required. For example, if the image forming apparatus 100 is a color printer, four color cartridges, namely cyan (C), magenta (M), yellow (Y) and black (K) cartridges, are mounted in the color printer in order to express desired colors. Additionally, the color printer may include other consumables. Accordingly, if a large number of units are required, each of the units requires its own input/output (I/O) channel, so the arrangement can be inefficient. Therefore, as illustrated in FIG. 3, a single serial I/O channel may be used to connect each of the plurality of units 200-1, 200-2, . . . , 200-n to the main controller 110. The main controller 110 may access each of the plurality of units 200-1, 200-2, . . . , 200-n using different addresses assigned to each of the plurality of units 200-1, 200-2, . . . , 200-n.

When the main controller 110 is turned on or when the plurality of units 200-1, 200-2, . . . , 200-n are mounted in the image forming apparatus 100, if each of the plurality of units 200-1, 200-2, . . . , 200-n is completely initialized, authentication is performed using unique digital signature information for each of the plurality of units 200-1, 200-2, . . . , 200-n.

If authentication is successful, the main controller 110 performs cryptographic data communication with a plurality of CPUs (not illustrated) in the plurality of units 200-1, 200-2, . . . , 200-n, and stores information regarding the use history in a plurality of memory units (not illustrated) in the plurality of units 200-1, 200-2, . . . , 200-n. The main controller 110 and plurality of CPUs may act as master and slave.

Here, the cryptographic data communication is performed by transmitting data, which a user desires to transmit, together with a MAC generated by encrypting the data using a preset cryptographic algorithm and key. Since the data varies every time it is transmitted, the MAC may also change. Accordingly, even when a third party intervenes in the data communication operation and finds a MAC, it is impossible for the third party to hack subsequent data communication operations using the MAC. Therefore, the security of data communication can be increased.

If the cryptographic data communication is completed, the channel connected between the main controller 110 and CPUs may be cut.

The storage unit 120 stores a variety of information including key values and a plurality of cryptographic algorithms required for authentication of each of the plurality of units 200-1, 200-2, . . . , 200-n.

The main controller 110 performs authentication and cryptographic data communication using the information stored in the storage unit 120. Specifically, the main controller 110 performs the authentication and the cryptographic data communication by applying an RSA asymmetric key algorithm and one of the ARIA, TDES, SEED, AES symmetric key algorithms, for example. Therefore, both asymmetric and symmetric authentication processes are performed, so it is possible to increase the cryptographic level, relative to the conventional art.

While FIG. 3 shows the storage unit 120 as a single unit, the storage unit 120 may include a storage unit to store a variety of cryptographic algorithm data, a storage unit required for other operations of the main controller 110, a storage unit to store information regarding the plurality of units 200-1, 200-2, . . . , 200-n, or a storage unit to store information regarding the use of the plurality of units 200-1, 200-2, . . . , 200-n (for example, sheets to be printed or remaining toner level).

The plurality of units 200-1, 200-2, ..., 200-*n* mounted in the image forming apparatus 100 of FIG. 3 may have the configurations illustrated in FIG. 1 or FIG. 2. Accordingly, after sending access commands to the plurality of CPUs of the plurality of units 200-1, 200-2, ..., 200-*n* and receiving acknowledge signals, the main controller 110 may access the plurality of units 200-1, 200-2, ..., 200-*n*. Therefore, the plurality of units according to an exemplary embodiment of the present general inventive concept differ from a conventional scheme capable of accessing CRUM data that uses simple data writing and reading operations.

If the image forming apparatus 100 starts an image forming job, the main controller 110 may measure degrees of use of consumables used for the job, and may transmit the measured degrees to each of the plurality of units 200-1, 200-2, ..., 200-*n*. In more detail, the image forming apparatus 100 may add the measured degrees of consumables used to previously stored information on the use of consumables, may transmit a result value to the plurality of units 200-1, 200-2, ..., 200-*n*, and may refresh the information on the use of consumables. When the operation of transmitting the result value occurs in the related art, if incorrect data is transmitted due to errors, incorrect information on the degrees of use of consumables used may be recorded on each of the plurality of units 200-1, 200-2, ..., 200-*n*. For example, if a print job of 10 new sheets is completed after 1000 sheets are printed using a currently mounted developer cartridge, the total value is 1010 sheets. However, if some errors occur and if a value of 0 sheets is transmitted, a record of a print job of 0 sheets may be made on the plurality of units 200-1, 200-2, ..., 200-*n*. As a result, it would be impossible for a user to accurately know the time at which the consumable needs to be replaced.

To solve this problem, in an embodiment of the general inventive concept, the main controller 110 may measure degrees of use of consumables used for the job, and may transmit only the measured degrees of consumables used to each of the plurality of units 200-1, 200-2, ..., 200-*n*. In this situation, the main controller 110 may transmit a value of 10 sheets, so the plurality of units 200-1, 200-2, ..., 200-*n* may, through the use of their own CPU's, add the newly received value of '10' to a value of '1000', namely a previously stored value. Accordingly, the information on the use of consumables stored in memory may be correctly updated to be '1010'.

Otherwise, the main controller 110 may manage the information on the degrees of use of consumables used by itself by adding the measured amounts to the information on the use of consumables stored in the storage unit 120, separately from the plurality of units 200-1, 200-2, ..., 200-*n*.

In an embodiment of the present general inventive concept, the main controller 110 may automatically update the information on the degrees of use of consumables stored in the storage unit 120 while transmitting the information on the degrees of use of consumables used to the plurality of units 200-1, 200-2, ..., 200-*n* every time the job is executed.

For example, when 100 sheets are printed using the plurality of units 200-1, 200-2, ..., 200-*n* mounted in the image forming apparatus 100, if 10 sheets are further printed while a single job is executed, the main controller 110 may send a value of '10' to the plurality of units 200-1, 200-2, ..., 200-*n*, and may add the value of '10' to a value of '100' previously stored in the storage unit 120, so as to store history information indicating that '110' sheets were printed. Accordingly, if a specific event occurs (for example, if the image forming apparatus 100 is reset or if toner or ink is completely exhausted), or if a preset period occurs, the main controller 110 and plurality of units 200-1, 200-2, ..., 200-*n* may compare their respective history information, through the use of their own CPUs, so it is possible to check whether data is normally recorded in each of the plurality of units 200-1, 200-2, ..., 200-*n*.

In other words, accuracy or inaccuracy of the information on the use of consumables stored may be determined by comparing the information on the use of consumables stored in the storage unit 120 to the information on the use of consumables stored in the plurality of units 200-1, 200-2, ..., 200-*n*. In more detail, if the events occur or if the preset period occurs, the main controller 110 may transmit a command to request the information on the use of consumables to the plurality of units 200-1, 200-2, ..., 200-*n*. In response to the request command, the CPUs of the plurality of units 200-1, 200-2, ..., 200-*n* may transmit the information on the use of consumables stored therein to the main controller 110.

If the information on the use of consumables stored in the storage unit 120 differs from the information on the use of consumables stored in the plurality of units 200-1, 200-2, ..., 200-*n*, the main controller 110 may output an error message, or may harmonize information determined to be correct and may update the information on the use of consumables.

Additionally, if the information on the use of consumables stored in the storage unit 120 differs from the information on the use of consumables stored in one of the plurality of units 200-1, 200-2, ..., 200-*n*, the main control 110 may transmit a command to change the information on the use of consumables stored in the storage unit 120, because there is a possibility that errors could occur when data is transmitted to the storage unit 120.

The image forming apparatus 100 may also include an image forming unit 150 to perform the image forming operation using the units 200-1, 200-2, ... 200-*n*. The units 200-1, 200-2 ... 200-*n* can be part of the image forming unit 150 when being installed in a body of the image forming apparatus 100. The main controller 110 can control the memory units 120 and 210 and the image forming unit 150 to feed a medium into the image forming apparatus to form an image on the medium and to discharge the medium.

Figure 4:
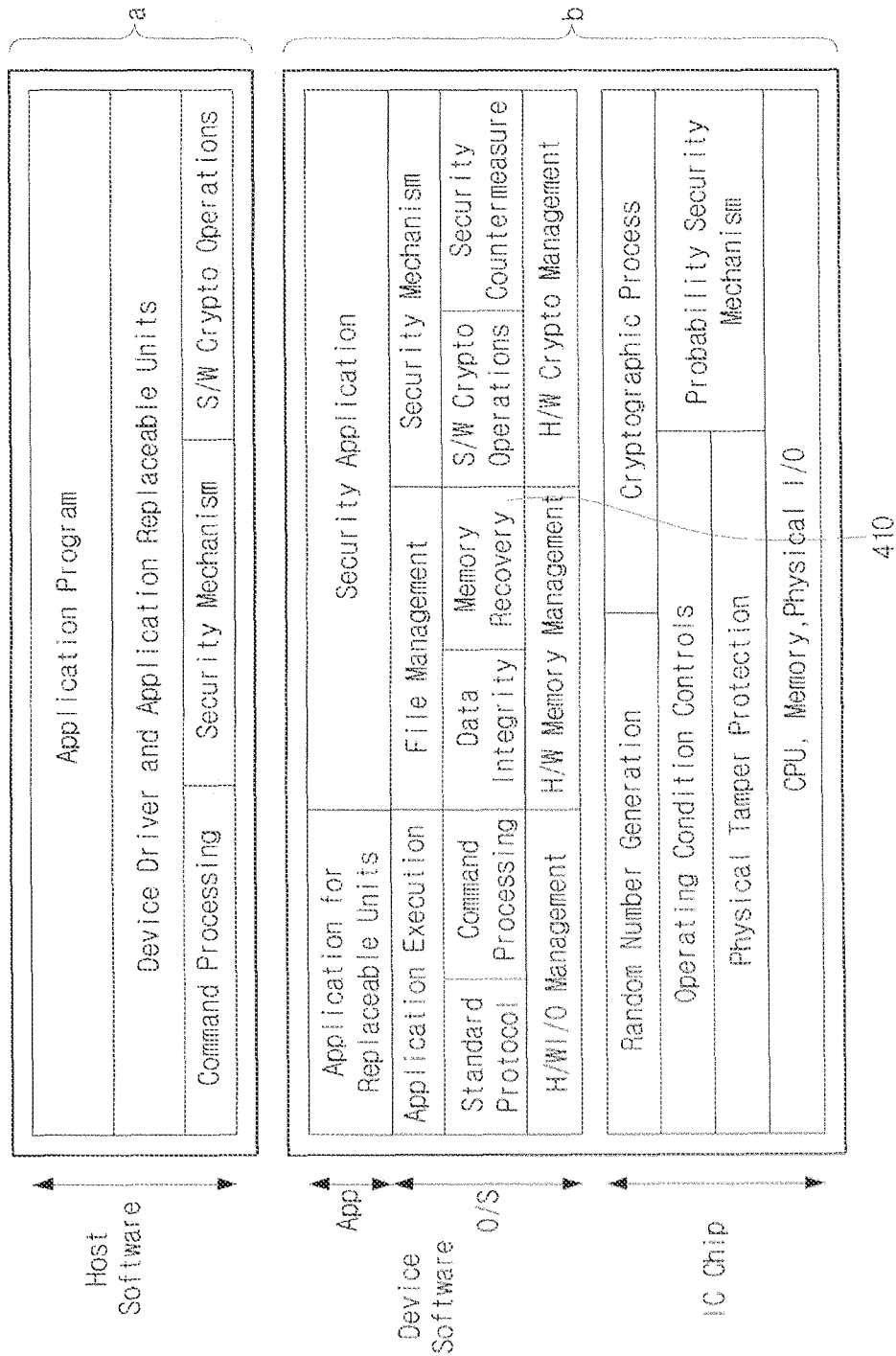
FIG. 4 is a schematic block diagram illustrating a configuration of software which is built into the image forming apparatus and the replaceable unit according to an exemplary embodiment of the present general inventive concept.

FIG. 4 is a hierarchy diagram illustrating a unit 200 and a host using the unit 200, that is, a configuration of software of an image forming apparatus according to an exemplary embodiment of the present general inventive concept.

Referring to FIGS. 1 and 4, software (a) of the image forming apparatus 100 may include a security mechanism region to perform authentication and cryptography with the unit 200, and a software cryptographic operation region to perform software cryptography, in addition to general application programs, an application for managing data of each unit, a device driver which performs its own management, and program for processing commands.

Software (b) of the unit 200 may include a semiconductor IC chip region having various blocks to secure data, an App region to interface with host software, and an OS region to operate the regions.

The Device Software region of FIG. 4 may include basic elements of an OS such as file management and data integrity programs. The OS region may further include operating blocks required to secure data including a security mechanism, software cryptographic operations and security countermeasure operations. The OS may include programs to control hardware for a security system including hardware memory management and hardware cryptographic management. As illustrated, the OS may include using a hardware input/output management function, as well as standard protocol, command processing, and application execution programs. The Application (App) region of the Device Software region includes an application for managing replaceable units and a general security application. The semiconductor IC chip region may house the CPU, physical memory and input/output terminals, and may further include a program to prevent tampering with other programs, a random number generation program, operating condition controls, a cryptographic process program, as well as a probability security mechanism. Since an application program to implement a function of CRUM is installed on the programs explained above, it is impossible to check information stored on data through a communication channel. The programs may be embodied in other structures than those illustrated in FIG. 4 to include the basic blocks. However, to efficiently secure data, it is required that the programs be programmed meticulously so that the OS is secured.

The OS region in the software structure of FIG. 4 includes a memory recovery region 410. The memory recovery region 410 is provided to guarantee whether the update is successfully achieved according to the process of updating the condition information of the unit 200.

Referring to FIGS. 1 and 2, when data is written on the memory unit 210, the CPU 220 of the unit 200 backs up previously recorded values within the memory recovery region 410, and sets a start flag.

For example, when the image forming job using the unit 200 is completed, the main controller 110 accesses the CPU 220 of the unit 200 so as to newly record condition information such as the amount of supplies or the number of sheets consumed when a print job is performed. If the power is cut off, or if the print job is terminated abnormally due to external noise before the recording is completed, the conventional CRUM may not be able to determine whether new condition information is normally recorded. If such abnormal conditions are repeated, it may be difficult to trust the information, and to manage the unit even using the CRUM.

To prevent these occurrences, the OS according to an exemplary embodiment of the present general inventive concept provides the memory recovery region 410 in the OS. In this case, the CPU backs up the previously recorded data in the memory recovery region 410 prior to recording data, and sets a start flag to 0. If a data writing operation is processed, the start flag is continuously updated according to the data writing operation.

In this state, if the data writing operation is terminated abnormally, the CPU checks the start flag after the power is turned on, or after a system is stabilized. The CPU thus determines whether the data is written normally according to the variation conditions of the start flag value. If the difference between the start flag value and the initially set value is not significant, the CPU determines that data writing has failed, and rolls back the data to the previously recorded values. On the other hand, if the start flag value coincides approximately with a final value, the CPU determines that the currently recorded data is correct. Therefore, even when the power is turned off, or when the system operates abnormally, the data written in the unit 200 may be trusted.

Figure 5:
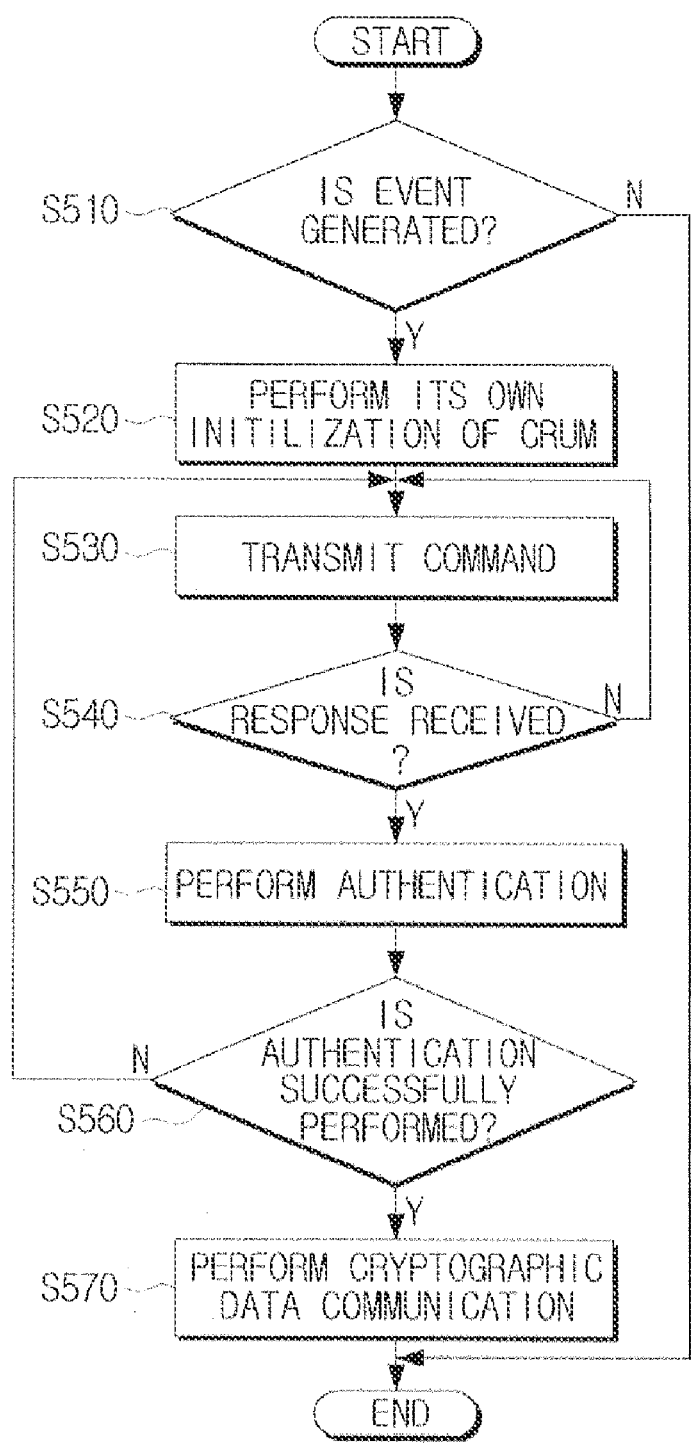
FIG. 5 is a flowchart illustrating a method of operating the replaceable unit and the image forming apparatus according to an exemplary embodiment of the present general inventive concept.

FIG. 5 is a flowchart illustrating a method of operating the replaceable unit and the image forming apparatus according to an exemplary embodiment of the present general inventive concept. Referring to FIGS. 1 and 5, the CPU of the unit 200 determines whether a specific event is generated in operation S510. The specific event may include a case in which the image forming apparatus 100 is powered on, or a case in which the unit 200 or components including the unit 200 are mounted in the image forming apparatus 100.

If it is determined that a specific event occurs, the unit 200 performs its own initialization in operation S520. The initialization includes calculating secret information required for data communication with the image forming apparatus after initialization, setup of a communication channel, initialization of memory values, checking remaining amounts of toner or ink, confirmation of the replacement time, or various other processes.

The main controller 110 of the image forming apparatus 100 transmits a command to attempt authentication between the main controller 110 and the CPU 220 in operation S530. If the main controller 110 does not receive a response from the CPU 220 in operation S540, the main controller 110 repeatedly transmits the command until the response is received.

When the response is received, the main controller 110 authenticates communication with the CPU 220 in operation S550, as explained above.

If the authentication is successfully performed in operation S560, cryptographic data communication with the main controller 110 is performed using a cryptographic algorithm in operation S570.

Figure 6:
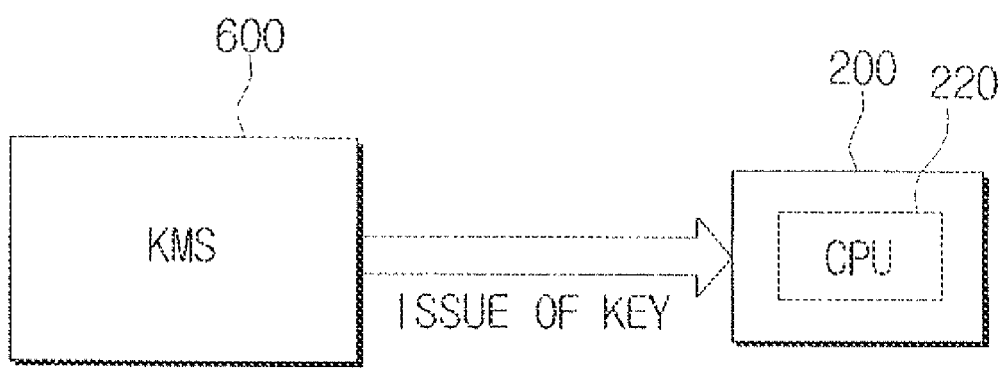
FIG. 6 is a flowchart illustrating a process of changing cryptographic algorithms by the replaceable unit according to an exemplary embodiment of the present general inventive concept.

FIG. 6 is a schematic view provided to explain a process of changing a cryptographic algorithm by the unit 200 according to an exemplary embodiment of the present general inventive concept. Referring to FIG. 6, the unit 200 may support ARIA, Triple Data Encryption Standard (TDES), SEED, and Advanced Encryption Standard (AES) symmetric key algorithms, for example. Determining the process of which algorithm to use may take place when a key write system in a key management system (KMS) 600 generates key generating data.

If a cracking of the cryptographic algorithm is performed, the cryptographic algorithm may be changed by acquiring a new key from the KMS to which another of the four cryptographic algorithms is applied instead of manufacturing a new unit 200.

As described above, the image forming apparatus 100 may also support ARIA, TDES, SEED, and AES symmetric key algorithms in addition to an RSA asymmetric key algorithm. Accordingly, even if the cryptographic algorithm applied to the unit 200 is changed, the image forming apparatus 100 changes a cryptographic algorithm in response, and performs the authentication and cryptographic data communication.

Therefore, the cryptographic algorithms may be changed conveniently by changing a key value in contrast to the conventional art, which requires a chip to be replaced.

FIG. 7 is a flowchart provided to explain a method of performing authentication and cryptographic data communication according to an exemplary embodiment of the present general inventive concept. Referring to FIGS. 1 and 7, an image forming apparatus 100 transmits a command to request authentication along with a random value R1 in operation S710.

If the request to perform authentication is received, the unit 200 generates a session key, using the received random value R1 and the random value R2 generated by the unit 200 in operation S715, and generates a message authentication code (MAC) using the generated session key in operation S720.

The first MAC, generated by the unit 200 is a pre-stored electronic signature information, and along with the random value R2 are transmitted to the image forming apparatus 100 in operation S725.

The image forming apparatus 100 verifies the received electronic signature of the first MAC generated by the unit 200 by comparing the received electronic signature information with a pre-stored electronic signature information in operation S730. To verify the received electronic signature, the image forming apparatus 100 may store electronic signature information of each unit, if a plurality of units are mounted in the image forming apparatus 100.

If the received electronic signature is verified, the image forming apparatus 100 generates a session key by combining the pre-generated random value R1 with the received random value R2 in operation S735, and a second MAC is generated by the image forming apparatus 100 using the generated session key in operation S740.

The image forming apparatus 100 then compares the generated second MAC of the image forming apparatus 100 with the received first MAC of the replaceable unit 200 in order to determine whether the two different MACs coincide in operation S745. The authentication is completed according to the verification of the received first MAC of the replaceable unit 200. If the authentication is successfully performed, the cryptographic data communication may be performed.

To perform cryptographic data communication, it is assumed that the image forming apparatus 100 uses the same key and cryptographic algorithm as those of the unit 200. The key may be the session key described above.

If the received first MAC of the replaceable unit 200 is completely verified, the image forming apparatus 100 generates a third MAC by applying the key and cryptographic algorithm to data when generating a communication message in operation S750.

The image forming apparatus 100 transmits the communication message including the third MAC to the unit 200 in operation S755.

The unit 200 extracts the data portion from the received communication message, and generates a fourth MAC by applying the above key and cryptographic algorithm to the data in operation S760.

The unit 200 extracts a third MAC portion from the received communication message, and performs authentication by comparing the extracted third MAC portion with the fourth MAC calculated by the unit 200 in operation S765.

If the extracted third MAC portion is consistent with the fourth MAC calculated by the unit 200, the communication message is treated as a valid communication message, and thus the operation corresponding to the message is performed in operation S770. On the other hand, if the third and fourth MACs are not consistent with each other, the communication message is treated as an invalid communication message, and is discarded.

A method of performing authentication and cryptographic data communication may also be applied to the exemplary embodiments explained with reference to the drawings. The unit 200 may be implemented in diverse forms such as a semiconductor chip or chip package, a normal unit, or a replaceable unit.

According to exemplary embodiments of the present general inventive concept, a CPU with an operation system (OS) of the CPU is mounted in the unit, so the unit can manage the memory unit independently. The unit may be a chip, a CRUM unit, or replaceable unit. The OS is driven so that initialization, cryptographic algorithm driving, and authentication with the main body of the image forming apparatus may be performed.

Even when a master key is not stored in the image forming apparatus having the unit, the image forming apparatus may perform authentication or cryptographic data communication with the unit. Therefore, a master key can be prevented from being leaked. The authentication or cryptographic data communication may be performed using a MAC generated based on a random value, and electronic signature information. The authentication is performed by applying both symmetric and asymmetric key algorithms, so the cryptography provides high level data security.

A plurality of cryptographic algorithms may be selectively applied to the authentication and the cryptographic data communications. Even if the currently used cryptographic algorithm is attacked by physical hacking, the attack may be prevented by replacing the currently used key with a key applying the other cryptographic algorithm without replacing the unit with a new unit.

If a plurality of units are used, electronic signature information is set for each unit. Individual addresses are given to each unit, and thus the unit may be connected to the image forming apparatus through a serial interface. Authentication and cryptographic data communication between the plurality of units is efficiently achieved.

If an image forming job is completed, the image forming apparatus measures the degrees of use of consumables required for the image forming job, and transmits the measured values to each of the plurality of units. Therefore, incorrect information regarding the degree of use of consumables is prevented from being recorded due to errors.

As a result, data stored in the memory unit built in the unit of the image forming apparatus is prevented from being copied or duplicated, and security of the data is enhanced. Users are also protected from using uncertificated unit.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A customer replaceable unit monitoring (CRUM) chip mountable in a replaceable unit that is mounted in a main body of an image forming apparatus, the CRUM chip comprising:

a memory unit storing an initialization program different from an operating system (O/S) operated in a main controller mounted in the main body, unique information associated with the replaceable unit, and status information on use of the replaceable unit; and a central processing unit (CPU) coupled to the memory unit, wherein the CPU performs initialization of the replaceable unit using the initialization program and updates the status information stored in the memory unit based on information on use of consumables used in the image forming apparatus transmitted through a serial interface from the main body.

2. The CRUM chip as claimed in claim 1, wherein the CPU receives a communication message where the information on use of the consumables is combined with a message authentication code ("MAC") from the main body.

3. The CRUM chip as claimed in claim 2, wherein the communication message includes a command to update the status information of the consumables stored in the memory unit.

4. The CRUM chip as claimed in claim 3, wherein the information on use of the consumables and the command are encrypted using a predetermined encryption algorithm.

5. The CRUM chip as claimed in claim 4, wherein the CPU decrypts the information on use of the consumables and the command encrypted using the encryption algorithm.

6. The CRUM chip as claimed in claim 2, wherein the CPU receives encrypted information on use of the consumables using a predetermined encryption algorithm from the main body.

7. An image forming apparatus, comprising:
a main body having a main controller which controls an operation of the image forming apparatus;
a replaceable unit mounted in the main body to communicate with the main controller through a serial interface;
a customer replaceable unit monitoring (CRUM) chip mounted in the replaceable unit,
wherein the CRUM chip comprises:
a memory unit storing an initialization program different from an operating system (O/S) operated in a main controller mounted in the main body, unique information associated with the replaceable unit, and status information on use of the replaceable unit; and
a central processing unit (CPU) coupled to the memory unit,
wherein the main controller of the main body transmits information on use of consumables used in the image forming apparatus to the CRUM chip through the serial interface,
wherein the CPU of the CRUM chip performs initialization of the replaceable unit using the initialization program and updates the status information stored in the memory unit based on information on use of consumables transmitted from the main controller.

8. The apparatus as claimed in claim 7, wherein the main controller transmits a communication message where the information on use of the consumables is combined with a message authentication code (MAC) to the CRUM chip.

9. The apparatus as claimed in claim 8, wherein the communication message includes a command to update the status information of the consumables stored in the memory unit.

10. The apparatus as claimed in claim 9, wherein the main controller encrypts the information on use of the consumables and the command using a predetermined encryption algorithm and transmits the encrypted information and command to the CRUM chip.

11. The apparatus as claimed in claim 10, wherein the CRUM chip decrypts the information and command encrypted using the encryption algorithm.

12. The apparatus as claimed in claim 8, wherein the main controller transmits the information on use of the consumables encrypted using the predetermined encryption algorithm to the CRUM chip.

13. The apparatus as claimed in claim 7, wherein the replaceable unit is a toner cartridge.

14. An image forming apparatus, comprising:
a main body including a main controller to control an operation of the image forming apparatus;
a replaceable unit mounted on the main body to communicate with the main controller through a serial interface; and
a customer replaceable unit monitoring ("CRUM") chip mounted in the replaceable unit,
wherein the CRUM chip comprises:
a memory unit storing unique information associated with the replaceable unit and status information on use of the replaceable unit; and
a central processing unit ("CPU") which is communicable with the memory unit,
wherein the main controller of the main body transmits information on use of the consumables to the CPU through the serial interface,
wherein the CPU of the CRUM chip updates the status information stored in the memory unit based on information on use of the consumables used in the image forming apparatus transmitted from the main body.

15. The apparatus as claimed in claim 14, wherein the main controller generates a communication message combining the information on use of the consumables with a MAC and transmits the communication message to the CRUM chip.

16. The apparatus as claimed in claim 15, wherein the communication message includes a command to update the status information of the consumables stored in the memory unit.

17. The apparatus as claimed in claim 16, wherein the main controller encrypts the information on use of the consumables and the command using a predetermined encryption algorithm and transmits the encrypted information and command to the CRUM chip.

18. The apparatus as claimed in claim 17, wherein the CRUM chip decrypts the information on use of the consumables and the command encrypted using the encryption algorithm.

19. The apparatus as claimed in claim 18, wherein the replaceable unit is a toner cartridge.

* * * * *